(12) United States Patent
Yang et al.

(10) Patent No.: US 11,410,574 B2
(45) Date of Patent: Aug. 9, 2022

(54) LAYERED ELECTRO-MAGNETIC REFRESHABLE BRAILLE DISPLAY DEVICE AND BRAILLE READER

(71) Applicant: ZHEJIANG SCI-TECH UNIVERSITY, Zhejiang (CN)

(72) Inventors: Wenzhen Yang, Zhejiang (CN); Yan Xu, Zhejiang (CN); Xinli Wu, Zhejiang (CN); Panfei Zhu, Zhejiang (CN)

(73) Assignee: ZHEJIANG SCI-TECH UNIVERSITY, Zhejiang (CN)

( * ) Notice: Subject to any disclaimer, the term of this patent is extended or adjusted under 35 U.S.C. 154(b) by 828 days.

(21) Appl. No.: 16/610,912

(22) PCT Filed: Nov. 12, 2014

(86) PCT No.: PCT/CN2014/090908
§ 371 (c)(1),
(2) Date: Nov. 5, 2019

(87) PCT Pub. No.: WO2016/074170
PCT Pub. Date: May 19, 2016

(65) Prior Publication Data
US 2020/0160747 A1    May 21, 2020

(51) Int. Cl.
*G09B 21/00* (2006.01)
*G06F 3/041* (2006.01)
*G09F 9/37* (2006.01)

(52) U.S. Cl.
CPC ......... *G09B 21/004* (2013.01); *G06F 3/0412* (2013.01); *G09B 21/007* (2013.01); *G09F 9/377* (2013.01)

(58) Field of Classification Search
CPC ...... G06F 3/0412; G06F 1/1692; G06F 3/016; G06F 3/041; G06F 3/04812;
(Continued)

(56) References Cited

U.S. PATENT DOCUMENTS

| 10,175,882 B2 * | 1/2019 | Labbé | G06F 3/0219 |
| 2012/0306750 A1 * | 12/2012 | Karasin | A63F 13/42 345/163 |
| 2013/0027320 A1 * | 1/2013 | Chang | G09B 21/007 345/173 |

FOREIGN PATENT DOCUMENTS

| CN | 101639823 | 2/2010 |
| CN | 101702267 | 5/2010 |

(Continued)

*Primary Examiner* — Nelson M Rosario (57) ABSTRACT

The present invention discloses a layered electro-magnetic refreshable braille display device and braille reader. The layered electro-magnetic refreshable braille display device includes three layers of braille display modules and a touch panel. Each braille display module includes 5 plates and a plurality of tactile pin driving mechanisms for driving the "up" and "down" of the braille dots. One or more lines of braille cells are arranged on the touch panel. Each line of braille cells displays a plurality of braille characters. A microprocessor is connected to a braille translation module, a voice playing module and an interaction controller respectively, wherein the interaction controller is connected to the braille display device, to form the braille reader. This device can display one or more lines of braille characters by relying on the electro-magnetic principle. It boasts real-time refreshing of the braille, synchronization of braille display and voice playing.

10 Claims, 4 Drawing Sheets

(58) Field of Classification Search
CPC ........ G06F 2203/04102; G09B 21/004; G09B 21/007; G09B 21/003; G09F 9/375; G09F 9/377; G09F 27/00; Y10T 29/49155
See application file for complete search history.

(56) References Cited

FOREIGN PATENT DOCUMENTS

| | | |
|---|---|---|
| CN | 104408994 | 3/2015 |
| CN | 204204267 | 3/2015 |

\* cited by examiner

LAYERED ELECTRO-MAGNETIC REFRESHABLE BRAILLE DISPLAY DEVICE AND BRAILLE READER

CROSS REFERENCE OF RELATED APPLICATION

This is a U.S. National Stage under 35 U.S.C 371 of the International Application PCT/CN2014/090908, filed Nov. 12, 2014.

BACKGROUND OF THE PRESENT INVENTION

Field of Invention

The present invention relates to a braille device and reader, and especially to a layered electro-magnetic refreshable braille display device and a portable braille reader for the visually impaired and the amblyopia people, and mainly used for braille reading and learning.

Description of Related Arts

According to the statistics of the WHO in 2010, there are 285 million people suffering visual impairment, among which the quantity of the blind is 39 million and that of the low-vision people is 246 million. The huge quantity of the blind requires more care and support from people in different sectors of the society.

Touch reading is the major means of reading for the blind due to its rapid speed and high identification. However, traditional braille books require expensive special paper, complicated making process and long time for understanding. Moreover, these braille books also have disadvantages, such as fewer publications, limited varieties and information, heavy in weight and inconvenience to carry. These factors lead to the fact that traditional braille books are far from enough to meet the reading demands of the blind. Developing an accessible reading tool by using the modern science for the blind becomes a social focus.

A braille reader can display the text in the traditional printing books or electronic files in the form of dynamic braille. With electronic braille books replacing traditional heavy braille books, the blind can read the dynamic braille text by touching with tip of fingers, thus satisfying the reading demand of the blind and being a major means to solve the reading difficulty of the blind.

Since the 1990s, the UK, the US and Japan are trying to develop braille readers. In 1997, Taylor P M et al. from the UK developed a contact pin array braille display with shape memory alloy as its actuators. In 1999, Anderson T et al. from the Sandia National Laboratories of the US developed an electro-magnetic driven type 2×3 probe array braille display device that generates slight vibrations and let the blind identify the braille text through the vibration felt by the finger tip of the operator after it is installed on the fingers of the operator. In 2000, the National Institute of Standards and Technology (NIST) of the US developed a rotary braille display that realizes braille reading without the need of moving fingers by arranging the braille on wheels and rotating at certain speed. In 2004, Kajimoto et al. from the University of Tokyo put forward a SmartTouch system. The system collects visual information via an optical sensor and converts it to tactile information identifiable by hands. The electrodes are made of stainless steel and the electrode diameter is 1.0 mm. They are arranged into spot stimulation array in the form of braille display. The longitudinal spacing between the electrodes is 2.5 mm, and the horizontal spacing is 2.0 mm. In the experiment, positive/negative pulse is used to selectively stimulate Merkel cell (pressure sensation) and Meissner corpuscle (vibration sensation) respectively so that the fingers have the sense of touch in order to identify braille code words. In 2005, a research group consisting of Takao Someya from the Graduate School of Engineering of the University of Tokyo and Takayasu Sakurai from the International Industry-University Cooperation Joint Research Center of the University of Tokyo jointly developed a thin-film braille display device using organic transistors, wherein the organic transistors formed on a flexible substrate drive the exciter made of high-polymer materials, surface generation or embossment elimination is controlled by current to form braille. This is the first time that the organic transistor and the exciter were embedded onto the same substrate and driven successfully.

Compared to foreign countries, the research of the technical field of braille display in China began comparatively late, and there still exists a big gap in both scale and depth. In 2001, Professor Mao Yuhang et al. from Tsinghua University developed the Tsinghua braille display, which is made of piezoelectric ceramics and displays braille by controlling piezoelectric ceramics to deform by flexing and bending through applied voltage. This further pushes the probe to ascend or descend, thus realizing human-machine interaction through the touch sensation of the blind. In 2010, Gu Chunxiao et al. from Southeast University achieved visual graphic-context display by using a 3×3 half-round head to stimulate the electrode and to further stimulate the finger tip of the operator. However, the narrow dynamic range of electro tactile leads to strict requirement for parameter range of electrical stimulation, difficulty in realization and unstable stimulation parameter, often causing sense of piercing pain.

The research results above are mostly under lab research. A minority of them have been productized and the products of braille display devices are sold at a high price. For instance, a braille cell (namely a braille character) costs about $100~150, a 40-cell braille display device costs $4000~6000, and an 80-cell braille display device costs $8000~12000. Such high price seriously hinders the promotion and popularization of the braille display devices and is difficult to benefit the majority of the disadvantaged groups of the blind. The main reasons lie in many research difficulties, such as, technological realization difficulty, high research and development cost, raw-material cost, and manufacturing cost

Description of Related Arts

SUMMARY OF THE PRESENT INVENTION

To address the problem existent in the prior art, the present invention puts forward a layered electro-magnetic refreshable braille display device and braille reader which can display one or more lines of braille characters by relying on the electro-magnetic principle. It boasts delicate mechanical structure design, low cost, small size, ease of carrying, stable performance, high reliability, capability of real-time refreshing of the braille, and synchronization of braille display and voice playing. This satisfies the reading and learning demands of the blind and realizes barrier-free reading, thus helping to raise the cultural level of the blind and improve the quality of life of the disadvantaged groups of the blind, having great social significance.

The technical solution of the present invention is as below:

1. A layered electro-magnetic refreshable braille display device:

comprises a third layer of braille display module, a second layer of braille display module, a first layer of braille display module and a touch panel. These components are installed in turn from down to up. The first layer of braille display module, the second layer of braille display module and the third layer of braille display module are arranged in a casing. The touch panel is mounted in the top-most position to act as the cover of the casing. One or more lines of braille cells are arranged on the touch panel with each line of braille cells having a plurality of evenly spaced braille characters and each braille cell having six braille dots. Power On/Off key, Play key, Stop key, Page Up key, Page Down key and Loudspeaker are set on the touch panel.

Each of the first layer of braille display module, the second layer of braille display module, and the third layer of braille display module comprises a bottom plate, a fixed plate, a pressing plate, an iron core plate, a circuit board and multiple groups of the tactile pin driving mechanisms corresponding to various braille cells. Each line of braille cells have six groups of the tactile pin driving mechanisms that are used to drive the "up" and "down" of the driving pins. The tactile pin driving mechanisms are arranged in the first layer of braille display module, the second layer of braille display module and the third layer of braille display module respectively with each two groups as a unit.

Each group of the tactile pin driving mechanisms comprises a plurality of evenly spaced driving components with the same structure. The quantity of the driving components is the same as that of the braille dots in each line, and each driving component controls one braille dot of the braille cells.

The driving components comprise a dot driving part, a reset spring, a coil element, an iron core and a pin cap, wherein the dot driving part is installed between the fixed plate and the pressing plate. The reset spring, the coil element and the iron core are installed between the pressing plate and the iron core plate. The pin cap is installed on the top of the dot driving part through the hole of the touch panel to act as the braille dot for the touching of the blind.

The dot driving part comprises a driving pin, a driving block, an armature and a fixed shaft. The lower part of the driving pin is fixed with one end of the driving block. The other end of the driving block is articulated onto the groove on the fixed plate via the fixed shaft. The upper part of the driving pin passes through the pressing plate, the reset spring, the iron core plate and the circuit board in order respectively and finally connects the pin cap on the touch panel.

The coil element comprises a coil holder and a coil. The coil holder has a through hole in the center. The coil winds around the coil holder. The lower part of the coil holder is provided with a foot stand for connecting the driving block. The upper part of the coil holder is configured with two fixed feet which are fixed onto the circuit board after passing through the iron core board.

The armature arranged in the driving block is built in the central through hole of the coil holder upon passing through the through groove in the pressing plate. The foot stand in the lower part of the coil holder is stuck on the driving block upon passing through the pressing plate to fix the driving block in position. The iron core is fixed on the bottom surface of the iron core plate and installed in the central through hole of the coil holder, and the bottom plate is fixed on the bottom surface of the fixed plate and located in the bottom layer of the braille display module.

Each braille cell consists of six 2×3 braille dots evenly spaced. The braille dots on the left are the first dot, the second dot and the third dot arranged in order downwards, and the braille dots on the right are the fourth dot, the fifth dot and the sixth dot arranged in order downwards. The tactile pin driving mechanisms in the first layer of braille display module drive the third braille dot and the fourth braille dot of each line of braille cells respectively. The tactile pin driving mechanisms in the second layer of braille display module drive the second braille dot and the fifth braille dot of each line of braille cells respectively and the tactile pin driving mechanisms in the third layer of braille display module drive the first braille dot and the sixth braille dot of each line of braille cells respectively.

2. A layered electro-magnetic refreshable braille display reader:

It comprises a braille translation module, a voice playing module, a microprocessor, and an interaction controller and the braille display device. The microprocessor is connected to the braille translation module, the voice playing module and the interaction controller respectively. The interaction controller is connected to the braille display device. The microprocessor translates the electronic ordinary text into the electronic braille text via the braille translation module. The electronic braille text is processed into braille control signals, which are delivered to the interaction controller. The interaction controller controls the braille display device to display the braille, and the microprocessor processes the electronic ordinary text into the voice signals which are then delivered to the voice playing module for audio playing.

The braille display device comprises a third layer of braille display module, a second layer of braille display module, a first layer of braille display module and a touch panel which are installed in turn from down to up. The first layer of braille display module, the second layer of braille display module and the third layer of braille display module are arranged in a casing. The touch panel is mounted in the top-most position to act as the cover of the casing. One or more lines of braille cells are arranged on the touch panel with each line of braille cells having a plurality of evenly spaced braille characters and each braille cell having six braille dots.

Each of the first layer of braille display module, the second layer of braille display module, and the third layer of braille display module comprises a bottom plate, a fixed plate, a pressing plate, an iron core plate, a circuit board and multiple groups of the tactile pin driving mechanisms corresponding to various braille cells.

Each line of braille cells have six groups of tactile pin driving mechanisms that are used to drive the "up" and "down" of the driving pins. The tactile pin driving mechanisms are arranged in the first layer of braille display module, the second layer of braille display module and the third layer of braille display module respectively with each two groups as a unit.

Each group of the tactile pin driving mechanisms comprises a plurality of evenly spaced driving components with the same structure. The quantity of the driving components is the same as that of the braille dots in each line, and each driving component controls one braille dot of the braille cells.

The driving components comprise a dot driving part, a reset spring, a coil element, an iron core and a pin cap, wherein the dot driving part is installed between the fixed plate and the pressing plate. The reset spring, the coil element and the iron core are installed between the pressing plate and the iron core plate. The pin cap is installed on the top of the dot driving part through the hole of the touch panel to act as the braille dot for the touching of the blind.

The dot driving part comprises a driving pin, a driving block, an armature and a fixed shaft. The lower part of the driving pin is fixed with one end of the driving block. The other end of the driving block is articulated onto the groove on the fixed plate via the fixed shaft. The upper part of the driving pin passes through the pressing plate, the reset spring, the iron core plate and the circuit board in order respectively and finally connects the pin cap on the touch panel.

The coil element comprises a coil holder and a coil. The coil holder has a through hole in the center, the coil winds around the coil holder. The lower part of the coil holder is provided with a foot stand for connecting the driving block. The upper part of the coil holder is configured with two fixed feet which are fixed onto the circuit board after passing through the iron core board.

The armature arranged in the driving block is built in the central through hole of the coil holder upon passing through the through groove in the pressing plate. The foot stand in the lower part of the coil holder is stuck on the driving block upon passing through the pressing plate to fix the driving block in position. The iron core is fixed on the bottom surface of the iron core plate and installed in the central through hole of the coil holder, and the bottom plate is fixed on the bottom surface of the fixed plate and located in the bottom layer of the braille display module.

Each braille cell consists of six 2×3 braille dots evenly spaced. The braille dots on the left are the first dot, the second dot and the third dot arranged in order downwards, and the braille dots on the right are the fourth dot, the fifth dot and the sixth dot are arranged in order downwards. The tactile pin driving mechanisms in the first layer of braille display module drive the third braille dot and the fourth braille dot of each line of braille cells respectively. The tactile pin driving mechanisms in the second layer of braille display module drive the second braille dot and the fifth braille dot of each line of braille cells respectively and the tactile pin driving mechanisms in the third layer of braille display module drive the first braille dot and the sixth braille dot of each line of braille cells respectively.

Power On/Off key, Play key, Stop key, Page Up key, Page Down key and Loudspeaker are set on the touch panel. The Power On/Off key, Play key, Stop key, Page Up key and Page Down key are all connected to the microprocessor, and the Loudspeaker is connected to a voice-playing module as the audio output device.

The present invention has the following favorable benefits:

The present invention, by relying on Faraday Electromagnetic induction, enables the solenoid electromagnet to generate magnetic force after power-on to push the driving parts in the braille display modules to move upwards, realizing embossment of braille dots. When power-off, it realizes the restoration of braille dots under the action of the reset spring after power-off.

The present invention is consistent with the arrangement rules of the braille, agreeable for the reading habit of the blind, with a delicate mechanical structure, easy to realize the control of braille dots, capable of rapidly producing braille and updating braille in time, and helpful to improve the reading efficiency and quality of life of the blind. In summary, it has the following effects:

(1) The layered electro-magnetic refreshable braille display device having delicate mechanical structure can not only satisfy the requirement of the braille dot resolution, but also greatly reduce the difficulty of manufacturing and assembly;

(2) The layered electro-magnetic refreshable braille display device is not only easy to acquire raw materials, but also easy to control the rise and fall of the braille dots;

(3) The number of braille characters can be extended to meet individualized reading demand of the blind;

(4) The small volume and light weight leads to easy carrying by the blind;

(5) Comparing with the conventional braille display devices, the present invention boasts low cost (for raw materials and manufacturing), helpful to the promotion and popularization of the braille readers and beneficial to the majority of the disadvantaged groups of the blind, great economic prospects and social value.

In the figures: 1. Power On/Off key; 2. Play key; 3. Stop key; 4. Page Up key; 5. Page Down key. 6. Loudspeaker; 7. braille dot; 8. first layer of braille display module; 9. second layer of braille display module; 10. third layer of braille display module; 11. fixed shaft; 12. coil; 13. iron core; 14. reset spring; 15. driving pin; 16. pin cap; 17. touch panel; 18. casing; 19. circuit board; 20. iron core plate; 21. sleeve; 22. pressing plate; 23. fixed plate; 24. bottom plate; 25. driving block; 26. armature; 27. foot stand; 28. fixed foot; 29. coil holder

DETAILED DESCRIPTION OF THE PREFERRED EMBODIMENT

The present invention is further detailed in combination with the drawings attached and embodiments hereinafter.

Figure 1:
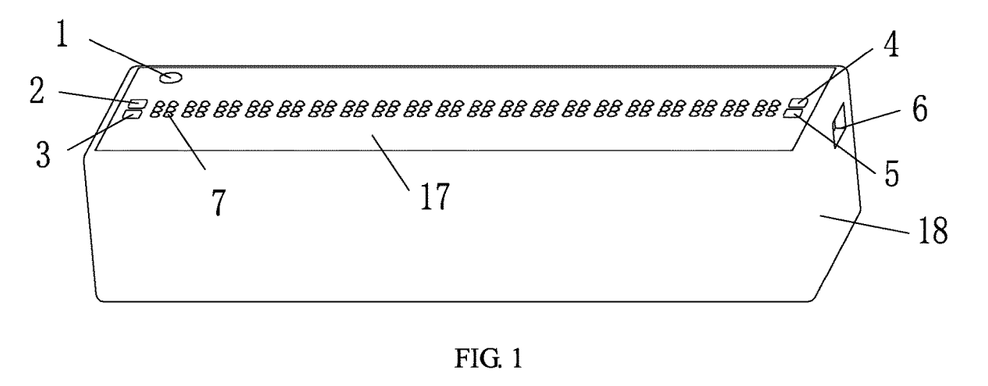
FIG. 1 shows the prospective view of the present invention.

As shown in FIG. 1, the layered electro-magnetic braille reader according to the present invention comprises:

a braille translation module, a voice playing module, a microprocessor, an interaction controller and a braille display device. The microprocessor is connected to the braille translation module, the voice playing module and the interaction controller respectively. The interaction controller is connected to the braille display device. The microprocessor translates the electronic ordinary text into the electronic braille text via the braille translation module. The electronic braille text is processed into braille control signals, which are delivered to the interaction controller. The interaction controller controls the braille display device to display the braille, and the microprocessor processes the electronic ordinary text into the voice signals which are then delivered to the voice playing module for audio playing.

Wherein, the microprocessor is connected to the interaction controller via a serial port to control the interaction controller to complete designated braille display task while power-on.

For the Chinese braille, the braille translation module can classify electronic ordinary text by using the maximum bilateral word matching method. The electronic ordinary text after words classification is translated to electronic ordinary phonetic-alphabet text. Some spaces are used to separate phonetic alphabets for various words. Afterwards, the electronic ordinary phonetic-alphabet text is translated to braille phonetic-alphabet codes that are finally combined to generate electronic braille text, thus realizing the translation from electronic ordinary text to electronic braille text.

The voice playing module can use a kind of voice chip (such as, JXW0213-080M etc.), which translates the electronic ordinary text to the audio digital information, and sends the audio digital information to the audio output device, for example, Loudspeaker 6 in FIG. 1, thus realizing voice playing. The microprocessor can use a ARM chip (such as, ARM1026EJ-S, etc.), which has small volume, low power consumption, high performance and rapid instruction execution speed. The electronic ordinary text is converted to electronic braille text in the microprocessor. The interaction controller can use CMOS (Complementary Metal Oxide Semiconductor) integrated circuit to complete the control of the braille dot.

Figure 2:
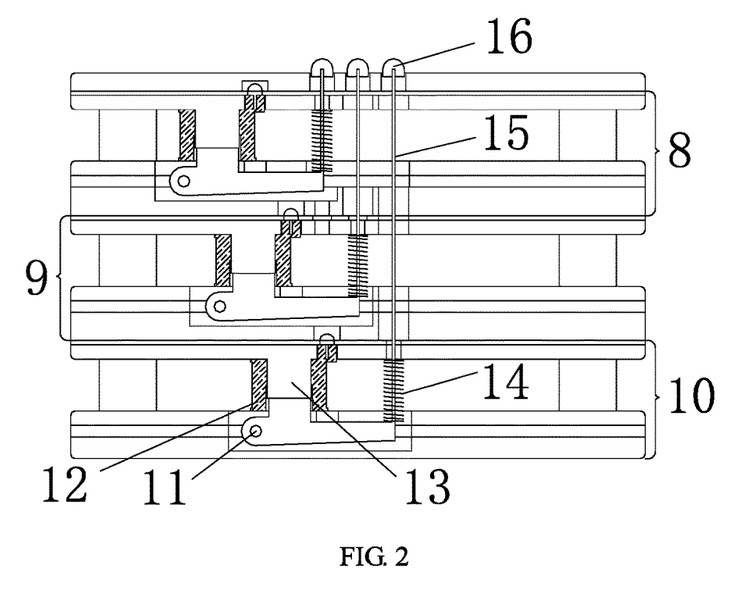
FIG. 2 shows the schematic view of the internal structure of the present invention.

As shown in FIG. 1 and FIG. 2, the layered electromagnetic refreshable braille display device according to the present invention is specifically as below: comprising a third layer of braille display module 10, a second layer of braille display module 9, a first layer of braille display module 8 and a touch panel 17 which are installed in turn from down to up. The first layer of braille display module 8, the second layer of braille display module 9 and the third layer of braille display module 10 are arranged in a casing 18. The touch panel 17 is mounted in the top-most position to act as the cover of the casing 18 and fixed with the casing as a whole. One or more lines of braille cells are arranged on the touch panel 17 with each line of braille cells having a plurality of evenly spaced braille characters and each braille cell having six braille dots.

Figure 9:
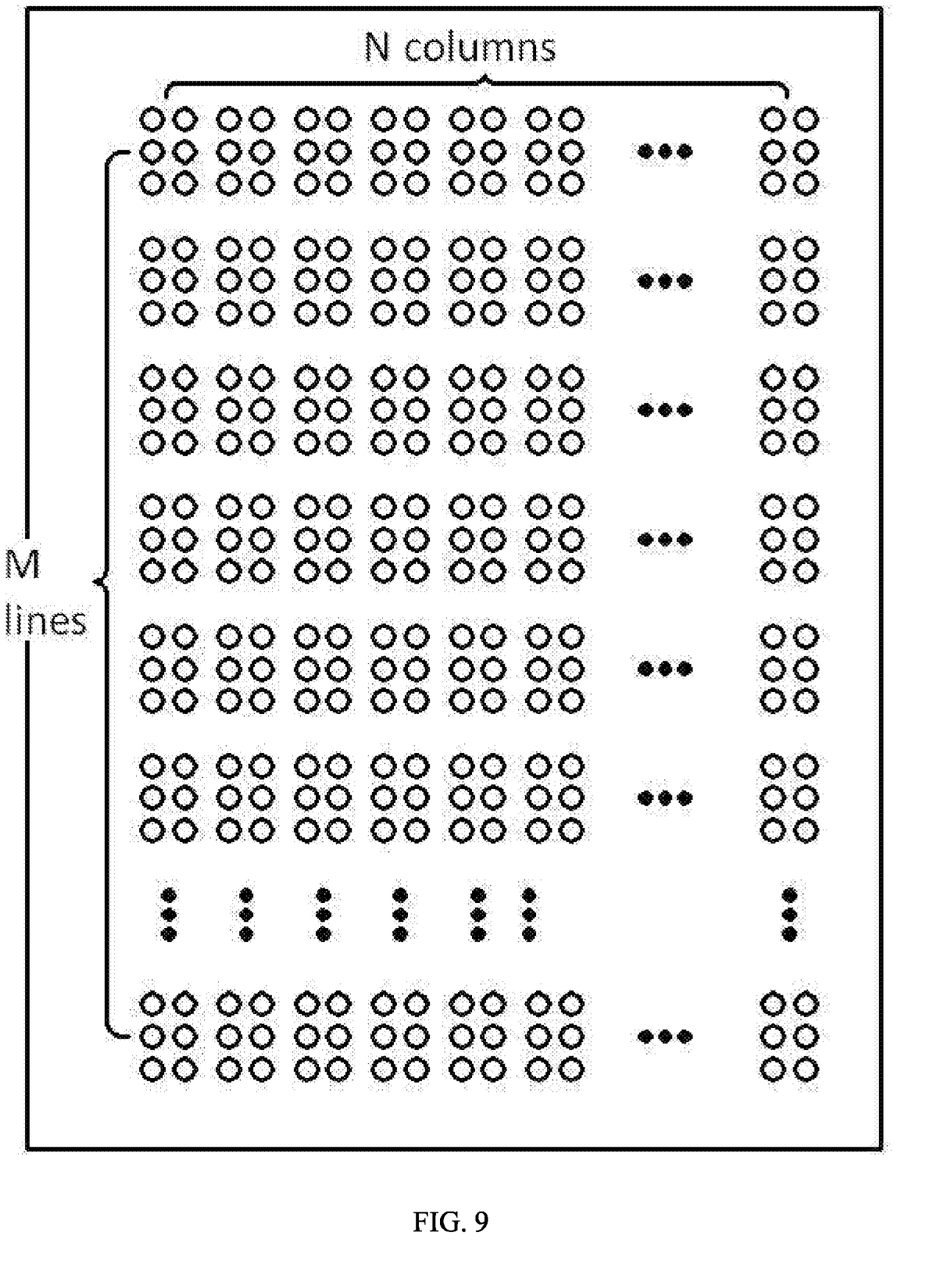
FIG. 9 shows the schematic view of multiple lines braille cells of the present invention.

The total number of the braille cells in the present invention can be increased according to line numbers. The spacing between lines can be set to 5-6 mm in accordance with China national standard GB/T 15720-2008. The quantity of braille cells for each line is the same. Multiple lines of braille characters can be displayed on a page, as shown in FIG. 9, which is consistent with the reading habit of the blind. When increasing a line of the braille cells, two groups of the tactile pin driving mechanisms shall be increased in the first layer of braille display module 8, the second layer of braille display module 9 and the third layer of braille display module 10 respectively.

Figure 3:
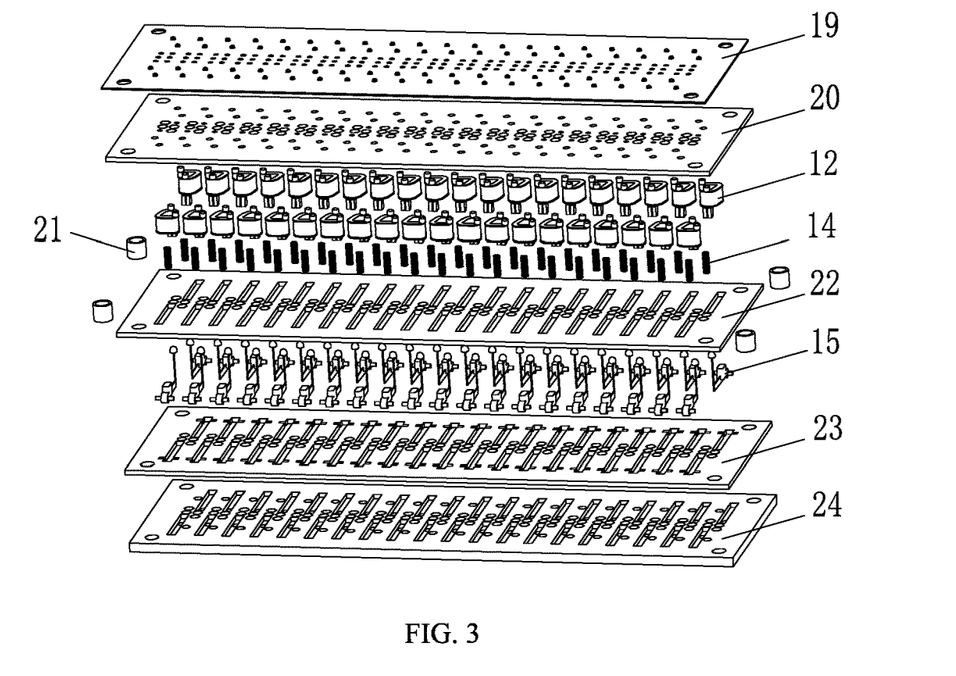
FIG. 3 shows the exploded view of the overall structure of the present invention.
Figure 4:
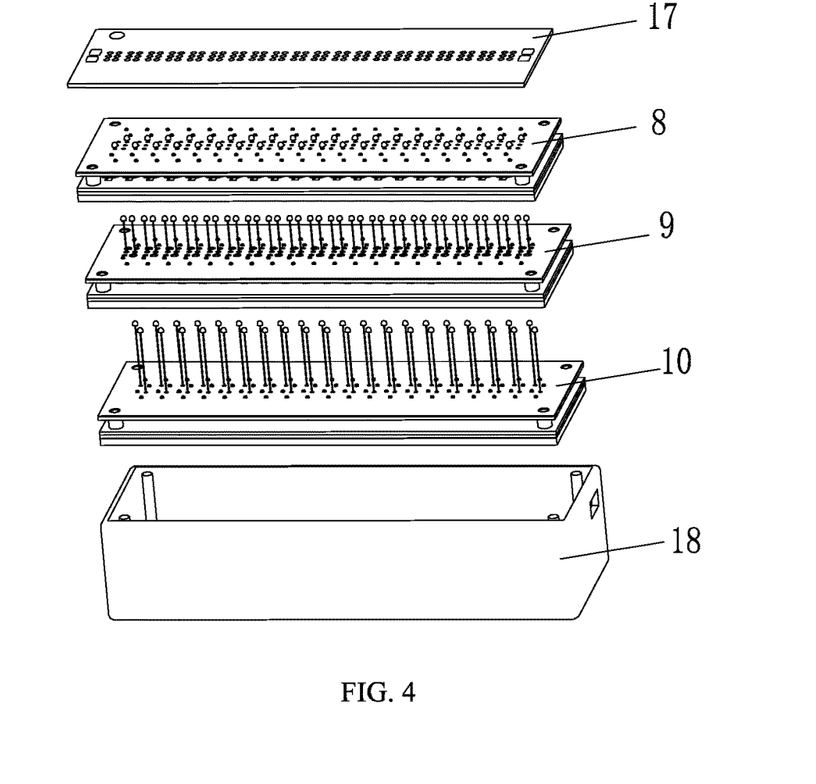
FIG. 4 shows the exploded view of the local structure of the present invention.

As shown in FIG. 3 and FIG. 4, each of the first layer of braille display module 8, the second layer of braille display module 9 and the third layer of braille display module 10 comprises a bottom plate 24, a fixed plate 23, a pressing plate 22, an iron core plate 20, a circuit board 19 and multiple groups of the tactile pin driving mechanisms corresponding to various braille cells. Each line of braille cells have six groups of the tactile pin driving mechanisms, which can be expanded according to the quantity of each line of braille cells and installed on braille display modules to drive the "up" and "down" of the driving pins. The six groups of the tactile pin driving mechanisms are arranged in the first layer of braille display module 8, the second layer of braille display module 9 and the third layer of braille display module 10 respectively with each two groups as a unit. The group number of the tactile pin driving mechanisms in each layer of the first layer of braille display module 8, the second layer of braille display module 9 and the third layer of braille display module 10 is twice of the line number of braille cells.

Figure 5:
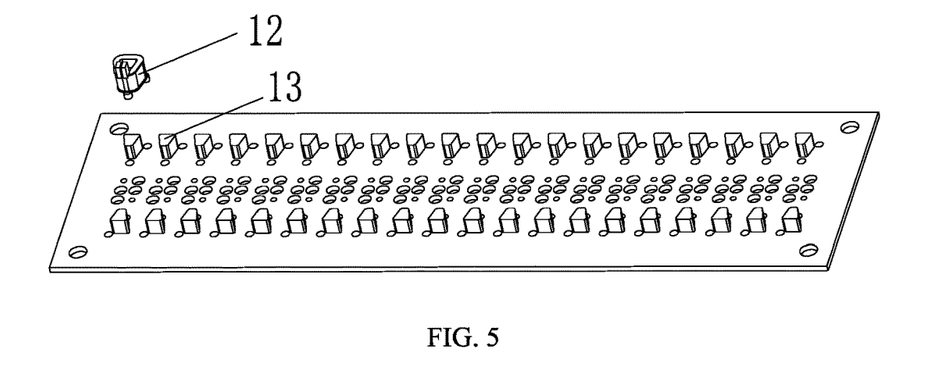
FIG. 5 shows the schematic view of the assembly relation between the bottom of the iron core plate and the coil element.

As shown in FIG. 4 and FIG. 5, each group of the tactile pin driving mechanisms comprises a plurality of evenly spaced driving components with the same structure. The quantity of the driving components is the same as that of the braille dots in each line, and each driving component controls one braille dot of the braille cells. The driving components comprise a dot driving part, a reset spring 14, a coil element, an iron core 13 and a pin cap 16, wherein the dot driving part is installed between the fixed plate 23 and the pressing plate 22. The reset spring 14, the coil element and the iron core 13 are installed between the pressing plate 22 and the iron core plate 20, and the pin cap 16 is located on the top of the dot driving part and installed on the touch panel 17 to act as the braille dot for the touching of the blind.

Figure 6:
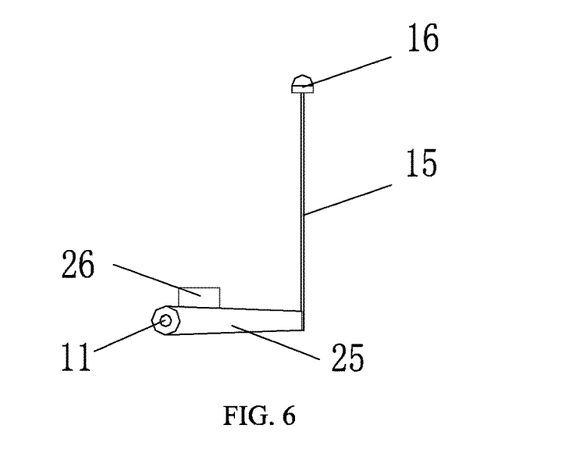
FIG. 6 shows the schematic view of the structure of the dot driving part.

As shown in FIG. 6, the dot driving part comprises a driving pin 15, a driving block 25, an armature 26, and a fixed shaft 11, wherein the lower part of the driving pin 15 is fixed with one end of the driving block 25. The upper part is fixed with the pin cap 16, the other end of the driving block 25 is articulated into the groove on the fixed plate 25 via the fixed shaft 11, the upper part of the driving pin 15 passes through the pressing plate 22, the reset spring 14, the iron core plate 20 and the circuit board 19 in order respectively and finally connects the pin cap 16 on the touch panel 17.

Figure 7:
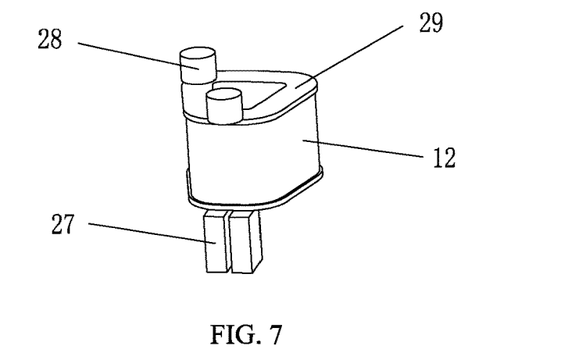
FIG. 7 shows the schematic view of the structure of the coil element.

As shown in FIG. 5 and FIG. 7, the coil element comprises a coil holder 29 and a coil 12, wherein the coil holder 29 has a through hole in the center, the coil 12 winds around the coil holder 29. The lower part of the coil holder 29 is provided with a foot stand 27 for connecting the driving block 25, the upper part of the coil holder 29 is configured with two fixed feet 28, which are fixed onto the circuit board after passing through the iron core board 20. The coil is fixed onto the iron core plate 20 and connected to the circuit board through the two fixed feet 28.

The armature 26 arranged in the driving block 25 is built in the central through hole of the coil holder 29 upon passing through the through groove in the pressing plate 22, the foot stand 27 in the lower part of the coil holder 29 is stuck on the driving block 25 upon passing through the pressing plate 22 to fix the driving block 25 in position. The dot driving part moves along a fixed track. The iron core 13 is fixed on the bottom surface of the iron core plate 20 and installed in the central through hole of the coil holder 29, and the bottom plate 24 is fixed on the bottom surface of the fixed plate 23 and located in the bottom layer of the braille display module.

Figure 8:
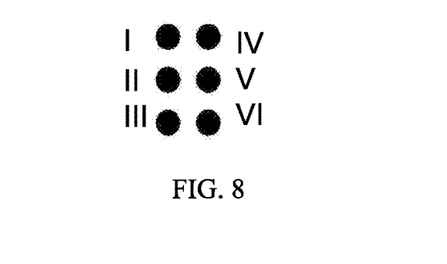
FIG. 8 shows the constitutional view of a braille character.

As shown in FIG. 8, the braille dots of the braille cell are arranged in the form of braille characters with each braille cell consisting of six 2×3 braille dots evenly spaced. The braille dots on the left are the first dot, the second dot and the third dot arranged in order downwards, and the braille dots on the right are the fourth dot, the fifth dot and the sixth dot arranged in order downwards. The tactile pin driving mechanisms in the first layer of braille display module 8 drive the third braille dot and the fourth braille dot of each line of braille cells respectively, realizing the "up" and "down" of two braille dots. The tactile pin driving mechanisms in the second layer of braille display module 9 drive the second braille dot and the fifth braille dot of each line of braille cells respectively, realizing the "up" and "down" of two braille dots. The tactile pin driving mechanisms in the third layer of braille display module 10 drive the first braille dot and the sixth braille dot of each line of braille cells respectively, realizing the "up" and "down" of two braille dots.

As shown in FIG. 8, the pin cap 16 as the braille dot is generally hemispherical or parabolic-shaped. The six braille dots for each line of the braille cells are spaced in a fixed distance and arranged in three lines and two columns. The bottom diameter is 1.0-1.6 mm, the height is 0.2-0.5 mm, the dot spacing is 2.2-2.8 mm and the braille cell spacing is 3.5-4.0 mm.

The zone of the function keys on the touch panel 17 includes Power On/Off key 1, Play key 2, Stop key 3, Page Up key 4 and Page Down key 5. The Power On/Off key 1, Play key 2, Stop key 3, Page Up key 4 and Page Down key 5 are all connected to the microprocessor. The Power On/Off key 1 realizes power connection and disconnection. The Play key 2 realizes voice playing and stopping. Stop key 3 realizes pause and restoration of braille display and voice playing. Page Up key 4 and Page Down key 5 realize page up and down function during reading.

The present invention, by relying on electromagnetic effect, enables the electromagnet consisting of the coil 12 and the iron core 13 to generate magnetic force after power-on, realizing embossment of braille dots. Otherwise, it realizes restoration of braille dots under the action of the reset spring 14 after power-off. Each braille dot corresponds to one point of the braille characters, and different dot embossment arrangements represent different braille characters.

After power-on, the current will pass through the coil 12. In the presence of the current, magnetic force will be generated on the both ends of the electromagnet. Under the action of the magnetic force, the armature 26 on the driving block is drawn towards the iron core 13 fixed on the iron core plate. Driven by the armature 26, the driving pin 15 on the driving block moves upwards, and braille dots are embossed on the touch panel 17. The dots are displayed according to output demands, forming the braille characters.

After power-off, the current in the coil 12 is 0. At this time, the magnetic force generated on the both ends of the electromagnet disappears. The reset spring 14 in compressive state drives the driving pin 15 to move downwards. Then the embossed dots disappear as the driving pin 15 restoring to the original position.

One embodiment of the present invention is as shown in FIGS. 1, 4 and 5. There is one line of braille word cells on the touch panel 17 which can display 20 braille characters. Each braille cell has 6 braille dots and the touch panel 17 has a total of 120 braille dots. Each of the first layer of braille display module 8, the second layer of braille display module 9 and the third layer of braille display module 10 has two groups of tactile pin driving mechanisms. Each group of tactile pin driving mechanisms comprises 20 driving components. A total of 120 driving components control the "up" and "down" of the 120 braille dots on the touch panel 17. The spacing between two braille cells is 3.5 mm and the spacing between two dots in the same cell is 2.5 mm. The total number of the braille cells in the present invention can be increased according to line quantity. As shown in FIG. 9, there are M lines of braille cells on the touch panel, each line can display N braille characters, and each braille cell has 6 braille dots. Then the touch panel 17 has a total of 6×M×N braille dots. Each of the first layer of braille display module 8, the second layer of braille display module 9 and the third layer of braille display module 10 has 2×M groups of tactile pin driving mechanisms. Each group of tactile pin driving mechanisms comprise N driving components. A total of 3×2×M×N driving components drive the 6×M×N braille dots on the touch panel 17.

The working process of the present invention is as below:

1) The initial state of the layered electro-magnetic refreshable braille reader is not to display braille, and the braille dots 7 are in the holes of the touch panel 17. The working state of the braille reader is to display braille, and the braille dots 7 may protrude from the plane of the touch panel 17, forming braille characters.

2) In the initial state, the microprocessor sends a "No Display" command to the interaction controller in the refreshable braille display device via the serial port, and the driving pin 15 is in the initial state. The interaction controller does not connects to the circuit board 19, no current passes through the solenoid coil 12, and no magnetic force is generated in the braille display modules 8, 9, 10, the driving block 25 is inactive, and the lower bottom surface of the driving block 25 contacts the bottom plate 24.

3) The conversion process of the layered electro-magnetic refreshable braille reader from "Not Displaying Braille" state to the "Display Braille" state: The microprocessor sends a "Display" command to the interaction controller via the serial port. The interaction controller connects to the circuit board 19 according to the command received. There is current passing through the solenoid coil 12 and magnetic force is generated in the braille display modules 8, 9, 10. Under the the magnetic force, the driving block 25 drives the driving pin 15 moving upwards from the initial position to the "Display" position before stop moving under the magnetic force and the force of the reset spring 14, and the driving pin 15 remains in the "Display" position. Moreover, the microprocessor sends the "Play" command to the voice playing module to realize voice playing.

4) After power-on, there is current passing through the coil 12. In the presence of the current, magnetic force will be generated on the both ends of the electromagnet. Under the magnetic force, the armature 26 on the driving block 25 is drawn towards the iron core 13. Driven by the driving block 25, the driving pin 15 moves upwards, thus making the pin cap 16 to form braille characters on the surface of the touch panel 17. These braille characters have certain significance.

5) In the working process of the layered electro-magnetic refreshable braille reader, the microprocessor can receive the commands from the function keys on the touch panel 17 and control related function keys to work according to the commands received. The zone of the function keys on the touch panel 17 includes Power On/Off key 1, Play key 2, Stop key 3, Page Up key 4 and Page Down key 5. the Power On/Off key 1, Play key 2, Stop key 3, Page Up key 4 and Page Down key 5 are all connected to the microprocessor. The Power On/Off key 1 realizes power on and off. The Play key 2 realizes voice playing and stopping. The stop key 3 realizes pause and restoration of braille display and voice playing. The Page Up key 4 and Page Down key 5 realize page up and down function during reading.

6) The conversion process of the layered electro-magnetic refreshable braille reader from "Display Braille" state to "Not Display Braille" state: The microprocessor sends "Reset" command to the interaction controller via the serial port. The interaction controller disconnects from the circuit board 19 according to the command received. The current in the solenoid coil 12 is lost and the magnetic force generated in the braille display modules 8, 9, 10 disappears. Without the magnetic force and under the force of the reset spring 14, the driving block 25 moves downwards and the driving pin 15 is restored from the "Display" position to the initial position. Moreover, the microprocessor sends a "Stop Playing" command to the voice playing module to realize the function of stopping voice playing.

7) After power disconnection, the current in the coil 12 is 0, the magnetic force generated on the both ends of the electromagnet disappears. The reset spring 14 in compressive state at this time drives the driving block 25 to move downwards. Then the driving pin 15 moves downwards accordingly, the braille character disappears, and the driving pin 15 is restored to the original position.

The embodiments above are used to interpret the present invention, rather than limit the present invention. Any changes and alternations within the spirit of the present invention and the scope of the Claims shall fall in the protection scope of the present invention

What is claimed is:

1. A layered electro-magnetic refreshable braille display device, comprising a third layer of braille display module (10), a second layer of braille display module (9), a first layer of braille display module (8), and a touch panel (17); wherein these components are installed in turn from down to up; the first layer of braille display module (8), the second layer of braille display module (9) and the third layer of braille display module (10) are arranged in a casing (18); the touch panel (17) is mounted in a top-most position to act as a cover of the casing (18); one or more lines of braille cells are arranged on the touch panel (17) with each line of the braille cells having a plurality of evenly spaced braille characters and each braille cell having six braille dots; power On/Off key (1), Play key (2), Stop key (3), Page Up key (4), Page Down key (5) and Loudspeaker (6) are set on the touch panel (17).

2. The layered electro-magnetic refreshable braille display, as recited in claim 1, wherein each of the first layer of braille display module (8), the second layer of braille display module (9), and the third layer of braille display module (10) comprises a bottom plate (24), a fixed plate (23), a pressing plate (22), an iron core plate (20), a circuit board (19) and multiple groups of tactile pin driving mechanisms corresponding to various braille cells; wherein each line of the braille cells have six groups of the tactile pin driving mechanisms that are used to drive "up" and "down" of driving pins; and two groups as a unit to be arranged in the first layer of braille display module (8), the second layer of braille display module (9) and the third layer of braille display module (10) respectively.

3. The layered electro-magnetic refreshable braille display device, as recited in claim 2, wherein each group of the tactile pin driving mechanisms comprises a plurality of evenly spaced driving components with the same structure; wherein quantity of the driving components is the same as that of the braille dots in each line, and each of the driving components controls one braille dot of the braille cells;

the driving components comprise a dot driving part, a reset spring (14), a coil element, an iron core (13) and a pin cap (16), wherein the dot driving part is installed between the fixed plate (23) and the pressing plate (22); the reset spring (14), the coil element and the iron core (13) are installed between the pressing plate (22) and the iron core plate (20); the pin cap (16) is installed on a top of the dot driving part through a hole of the touch panel (17) to act as the braille dot for touchings of a blind;

wherein the dot driving part comprises a driving pin (15), a driving block (25), an armature (26) and a fixed shaft (11); a lower part of the driving pin (15) is fixed with a first end of the driving block (25); a second end of the driving block (25) is articulated onto a groove on the fixed plate (23) via the fixed shaft (11); an upper part of the driving pin (15) passes through the pressing plate (22), the reset spring (14), the iron core plate (20) and the circuit board (19) in order respectively and finally connects the pin cap (16) on the touch panel (17);

wherein the coil element comprises a coil holder (29) and a coil (12); the coil holder (29) has a through hole in a center; the coil (12) winds around the coil holder (29); a lower part of the coil holder (29) is provided with a foot stand (27) for connecting the driving block (25) an upper part of the coil holder (29) is configured with two fixed feet (28) which are fixed onto the circuit board (19) after passing through the iron core board (20);

wherein the armature (26) arranged in the driving block (25) is built in a central through hole of the coil holder (29) upon passing through the through groove in the pressing plate (22); the foot stand (27) in the lower part of the coil holder (29) is stuck on the driving block (25) upon passing through the pressing plate (22) to fix the driving block (25) in position; the iron core (13) is fixed on a bottom surface of the iron core plate (20) and installed in the central through hole of the coil holder (29), and the bottom plate (24) is fixed on a bottom surface of the fixed plate (23) and located in a bottom layer of the braille display module.

4. The layered electro-magnetic refreshable braille display device as claimed in any one of claim 1, wherein each braille cell consists of six 2×3 braille dots evenly spaced; the braille dots on a left are a first dot, a second dot and a third dot arranged in order downwards, and the braille dots on the right are a fourth dot, a fifth dot and a sixth dot arranged in order downwards; the tactile pin driving mechanisms in the first layer of braille display module (8) drive the third dot and the fourth dot of each line of braille cells respectively; the tactile pin driving mechanisms in the second layer of braille display module (9) drive the second dot and the fifth dot of each line of braille cells respectively and the tactile pin driving mechanisms in the third layer of braille display module (10) drive the first dot and the sixth dot of each line of braille cells respectively.

5. A layered electro-magnetic refreshable braille reader, comprising a braille translation module, a voice playing module, a microprocessor, an interaction controller and a braille display device wherein the microprocessor is connected to the braille translation module, the voice playing module and the interaction controller respectively; the interaction controller is connected with the braille display device the microprocessor translates an electronic ordinary text into an electronic braille text via the braille translation module; the electronic braille text is processed into braille control signals, which are delivered to the interaction controller; the interaction controller controls the braille display device to display a braille, and the microprocessor processes the electronic ordinary text into voice signals which are then delivered to the voice playing module for audio playing;

wherein the braille display device is comprised of a third layer of the braille display module (10), a second layer of the braille display module (9), a first layer of the braille display module (8) and a touch panel (17); these components are installed in turn from down to up; the first layer of the braille display module (8), the second layer of the braille display module (9) and the third layer of the braille display module (10) are arranged in a casing (18); the touch panel (17) is mounted in a top-most position to act as a cover of the casing (18); one or more lines of braille cells are arranged on the touch panel (17) with each line of the braille cells having a plurality of evenly spaced braille characters and each of the braille cells having six braille dots.

6. The layered electro-magnetic refreshable braille reader as recited in claim 5, wherein each of the first layer of braille display module (8), the second layer of braille display module (9) and the third layer of braille display module (10) comprises a bottom plate (24), a fixed plate (23), a pressing plate (22), an iron core plate (20), a circuit board (19) and multiple groups of the tactile pin driving mechanisms corresponding to various braille cells;

wherein each line of the braille cells has six groups of tactile pin driving mechanisms, which are used to drive the "up" and "down" of the driving pins and arranged in the first layer of braille display module (8), the second layer of braille display module (9) and the third layer of braille display module (10) respectively, wherein each two groups are a unit.

7. The layered electro-magnetic refreshable braille reader as claimed in claim 6, wherein each group of the tactile pin driving mechanisms comprises a plurality of evenly spaced driving components with a same structure; a quantity of the driving components is same as that of braille dots in each line, and each driving component controls one braille dot of the braille cells;

wherein the driving components comprise a dot driving part, a reset spring (14), a coil element, an iron core (13) and a pin cap (16), wherein the dot driving part is installed between the fixed plate (23) and the pressing plate (22); the reset spring (14), the coil element and the iron core (13) are installed between the pressing plate (22) and the iron core plate (20); the pin cap (16) is installed on a top of the dot driving part through a hole of the touch panel (17) to act as a braille dot for the touching of the blind.

8. The layered electro-magnetic refreshable braille reader as recited in claim 7, wherein the dot driving part comprises a driving pin (15), a driving block (25), an armature (26) and a fixed shaft (11); a lower part of a driving pin (15) is fixed with a first end of a driving block (25); a second end of the driving block (25) is articulated onto a groove on the fixed plate (23) via a fixed shaft (11); an upper part of the driving pin (15) passes through the pressing plate (22), the reset spring (14), the iron core plate (20) and the circuit board (19) in order respectively and finally connects the pin cap (16) on the touch panel (17);

wherein the coil element is comprised of a coil holder (29) and a coil (12); the coil holder (29) has a through hole in the center; the coil (12) winds around the coil holder (29); a lower part of the coil holder (29) is provided with a foot stand (27) for connecting the driving block (25); an upper part of the coil holder (29) is configured with two fixed feet (28), which are fixed onto the circuit board (19) after passing through the iron core board (20);

wherein the armature (26) arranged in the driving block (25) is built in the central through hole of the coil holder (29) upon passing through the through groove in the pressing plate (22); the foot stand (27) in the lower part of the coil holder (29) is stuck on the driving block (25) upon passing through the pressing plate (22) to fix the driving block (25) in position; the iron core (13) is fixed on a bottom surface of the iron core plate (20) and installed in the central through hole of the coil holder (29), and the bottom plate (24) is fixed on an bottom surface of the fixed plate (23) and located in a bottom layer of the braille display module.

9. The layered electro-magnetic refreshable braille reader as claimed in any one of claim 5, wherein each braille cell consists of six 2×3 braille dots evenly spaced; the braille dots on a left are a first dot, a second dot and a third dot arranged in order downwards, and the braille dots on the right are a fourth dot, a fifth dot and a sixth dot are arranged in order downwards;

wherein the tactile pin driving mechanisms in the first layer of braille display module (8) drive the third braille dot and the fourth braille dot of each line of braille cells respectively; the tactile pin driving mechanisms in the second layer of braille display module (9) drive the second braille dot and the fifth braille dot of each line of braille cells respectively and the tactile pin driving mechanisms in the third layer of braille display module (10) drive the first braille dot and the sixth braille dot of each line of braille cells respectively.

10. The layered electro-magnetic refreshable braille reader as claimed in any one of claim 5, wherein a Power On/Off key (1), a Play key (2), a Stop key (3), a Page Up key (4), a Page Down key (5) and a Loudspeaker (6) are set on the touch panel (17); a Power On/Off key (1), a Play key (2), a Stop key (3), a Page Up key (4) and a Page Down key (5) are all connected to the microprocessor, and the Loudspeaker (6) is connected with a voice-playing module as a audio output device.

\* \* \* \* \*